(12) United States Patent
Yokoi et al.

(10) Patent No.: US 7,832,795 B2
(45) Date of Patent: Nov. 16, 2010

(54) VEHICLE FRONT STRUCTURE

(75) Inventors: Yoshimitsu Yokoi, Toyota (JP);
Hideyuki Yoshioka, Okazaki (JP);
Tetsuro Fukuhara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 411 days.

(21) Appl. No.: 11/905,588

(22) Filed: Oct. 2, 2007

(65) Prior Publication Data

US 2008/0084092 A1 Apr. 10, 2008

(30) Foreign Application Priority Data

Oct. 6, 2006 (JP) .............................. 2006-274785

(51) Int. Cl.
*B62D 25/20* (2006.01)

(52) U.S. Cl. .............. 296/204; 296/193.02; 296/203.02

(58) Field of Classification Search ............ 296/187.09, 296/193.09, 203.02, 204, 192, 193.02, 193.07; 180/90.6
See application file for complete search history.

(56) References Cited

U.S. PATENT DOCUMENTS

| | | | | | |
|---|---|---|---|---|---|
| 3,321,235 | A | * | 5/1967 | Muller et al. ................. | 296/204 |
| 4,466,653 | A | * | 8/1984 | Harasaki .................. | 296/187.09 |
| 5,127,704 | A | * | 7/1992 | Komatsu ..................... | 296/204 |
| 5,882,065 | A | * | 3/1999 | Koiwa et al. ........... | 296/203.02 |
| 5,992,921 | A | * | 11/1999 | Seki ....................... | 296/187.09 |
| 6,179,372 | B1 | * | 1/2001 | Sakamoto et al. ...... | 296/203.02 |
| 6,203,099 | B1 | * | 3/2001 | Iwatsuki ..................... | 296/204 |
| 6,209,948 | B1 | * | 4/2001 | Mori et al. .............. | 296/187.09 |
| 6,460,918 | B1 | * | 10/2002 | Sato et al. ................... | 296/204 |
| 6,547,318 | B2 | * | 4/2003 | Takeuchi .................... | 296/204 |
| 6,830,289 | B2 | * | 12/2004 | Miyabayashi .......... | 296/193.07 |
| 6,857,691 | B2 | * | 2/2005 | Kuroda et al. .......... | 296/203.02 |
| 6,908,146 | B2 | * | 6/2005 | Tomita .................. | 296/203.02 |
| 7,188,893 | B2 | * | 3/2007 | Akasaka ..................... | 296/204 |
| 7,222,911 | B2 | * | 5/2007 | Abe et al. .............. | 296/187.11 |
| 7,226,121 | B2 | * | 6/2007 | Dandekar et al. ........... | 296/204 |
| 7,434,871 | B2 | * | 10/2008 | Mizuma et al. ........ | 296/193.07 |
| 7,614,684 | B2 | * | 11/2009 | Yasuhara et al. ....... | 296/187.09 |
| 2001/0030450 | A1 | * | 10/2001 | Miyasaka .................. | 296/204 |

(Continued)

FOREIGN PATENT DOCUMENTS

DE 4029153 A1 * 4/1991

(Continued)

*Primary Examiner*—Glenn Dayoan
*Assistant Examiner*—Paul A Chenevert
(74) *Attorney, Agent, or Firm*—Oliff & Berridge, PLC

(57) ABSTRACT

A front side member has: a front frame portion disposed such that a longitudinal direction of the front frame portion runs along a vehicle longitudinal direction; a rear frame portion which is offset toward a vehicle bottom side with respect to the front frame portion at a vehicle rear side of the front frame portion, and which is disposed such that a longitudinal direction of the rear frame portion runs along the vehicle longitudinal direction; and a connecting frame portion connecting a rear end of the front frame portion and a front end of the rear frame portion. A concave portion is formed at a vehicle top-bottom direction intermediate portion of the connecting frame portion. A dash cross member, which is disposed such that a longitudinal direction of the dash cross member runs along a vehicle transverse direction, is provided within the concave portion.

12 Claims, 12 Drawing Sheets

U.S. PATENT DOCUMENTS

| | | | |
|---|---|---|---|
| 2002/0067053 A1* | 6/2002 | Wolkersdorfer et al. | 296/204 |
| 2002/0175538 A1* | 11/2002 | Porner | 296/204 |
| 2003/0080588 A1* | 5/2003 | Sakuma | 296/204 |
| 2003/0189358 A1* | 10/2003 | Watanabe et al. | 296/203.02 |
| 2004/0113462 A1* | 6/2004 | Winter et al. | 296/203.02 |
| 2004/0189055 A1* | 9/2004 | Tomita | 296/203.02 |
| 2005/0082877 A1* | 4/2005 | Gotou et al. | 296/204 |
| 2005/0104356 A1* | 5/2005 | Vincenti | 280/795 |
| 2005/0140179 A1* | 6/2005 | Morsch et al. | 296/204 |
| 2005/0189788 A1* | 9/2005 | Cornell et al. | 296/187.09 |
| 2006/0238000 A1* | 10/2006 | Tohda et al. | 296/204 |
| 2008/0265623 A1* | 10/2008 | Kiyotake et al. | 296/187.09 |
| 2009/0096253 A1* | 4/2009 | Yatsuda | 296/193.09 |

FOREIGN PATENT DOCUMENTS

| | | |
|---|---|---|
| EP | 1 382 514 A1 | 1/2004 |
| EP | 1 437 291 A2 | 7/2004 |
| JP | 63263177 A * | 10/1988 |
| JP | A-01-254476 | 10/1989 |
| JP | U-04-009378 | 1/1992 |
| JP | 04092775 A * | 3/1992 |
| JP | A 8-282537 | 10/1996 |
| JP | A-10-045034 | 2/1998 |
| JP | A-2003-191862 | 7/2003 |
| JP | A-2003-212157 | 7/2003 |
| JP | A-2005-206107 | 8/2005 |
| JP | A-2006-159983 | 6/2006 |

* cited by examiner

VEHICLE FRONT STRUCTURE

CROSS-REFERENCE TO RELATED APPLICATION

This application claims priority under 35 USC 119 from Japanese Patent Application No. 2006-274785, the disclosure of which is incorporated by reference herein.

BACKGROUND OF THE INVENTION

1. Field of the Invention

The present invention relates to a vehicle front structure of an automobile, and in particular, relates to a vehicle front structure having left and right front side members which are disposed such that the longitudinal directions thereof run along the vehicle longitudinal direction.

2. Description of the Related Art

There is known a conventional vehicle front structure having left and right front side members which are disposed such that the longitudinal directions thereof run along the vehicle longitudinal direction (see, for example, Japanese Patent Application Laid-Open (JP-A) No. 8-282537). In this technique, the rear end portions of the pair of front side members are joined to a dash panel. A dash cross portion, which extends in the vehicle transverse direction along the dash panel and has a closed cross-section portion, is provided between the rear end portions of the pair of front side members.

However, in the vehicle front structure disclosed in JP-A No. 8-282537, the front side members are reinforced by a vehicle cabin inner side dash cross member. The space within the vehicle cabin is narrowed because the vehicle cabin inner side dash cross member projects-out toward the vehicle cabin inner side of the dash panel.

SUMMARY OF THE INVENTION

In view of the aforementioned, an object of the present invention is to provide a vehicle front structure which can ensure space within the vehicle cabin and which can suppress deformation of front side members which arises at the time of a front collision of the vehicle.

A vehicle front structure of a first aspect of the present invention has: left and right front side members each having a front frame portion disposed such that a longitudinal direction of the front frame portion runs along a vehicle longitudinal direction, a rear frame portion which is offset toward a vehicle bottom side with respect to the front frame portion at a vehicle rear side of the front frame portion and which is disposed such that a longitudinal direction of the rear frame portion runs along the vehicle longitudinal direction, and a connecting frame portion connecting a rear end of the front frame portion and a front end of the rear frame portion, a concave portion, which is recessed toward a vehicle cabin outer side being formed at a vehicle top-bottom direction intermediate portion of the connecting frame portion; and a vehicle transverse direction frame member disposed such that a longitudinal direction of the vehicle transverse direction frame member runs along a vehicle transverse direction, and provided within the concave portions of the connecting frame portions at the left and right front side members.

Concave portions, which are recessed toward a vehicle cabin outer side, are formed in the vehicle top-bottom direction intermediate portions of the connecting frame portions at the left and right front side members. The vehicle transverse direction frame member, which is disposed such that the longitudinal direction thereof runs along the vehicle transverse direction, is provided within the concave portions. As a result, the amount by which the vehicle transverse direction frame member projects-out into the vehicle cabin can be curbed.

Further, the front side members are disposed such that, with respect to the front frame portions which are disposed such that the longitudinal directions thereof run along the vehicle longitudinal direction, the rear frame portions, which are disposed such that the longitudinal directions thereof run along the vehicle longitudinal direction, are offset toward a vehicle bottom side with respect to the front frame portions at vehicle rear sides of the front frame portions. Therefore, at the time of a front collision of the vehicle, vertical bending moments, whose peak values are at the upper ends and lower ends of the connecting frame portions which connect the front frame portions and the rear frame portions, are generated at the front side members due to the load which is inputted to the front frame portions of the front side members.

At this time, in the present invention, the vehicle transverse direction frame member is joined to the interiors of the concave portions which are formed at intermediate positions between the peak values of the vertical bending moments of the upper ends and the lower ends of the connecting frame portions of the front side members. Therefore, it is difficult for the strength with respect to the vertical bending moments to be affected by the reduction in the cross-sections which arises due to the formation of the concave portions in the front side members. Moreover, the reduction in the space within the vehicle cabin due to projecting-out of the cross-section of the vehicle transverse direction frame member can be made to be small. Still further, the concave portions of the connecting frame portions, whose cross-sectional areas are reduced and whose strengths are decreased, can be reinforced by the vehicle transverse direction frame member. As a result, deformation of the front side members which arises at the time of a front collision of the vehicle is suppressed.

The vehicle front structure of the first aspect of the present invention can ensure space within the vehicle cabin, and can suppress deformation of the front side members which arises at the time of a front collision of the vehicle.

Further, the vehicle front structure of the first aspect of the present invention may further have left and right rockers which are disposed at lower portions of vehicle transverse direction outer sides of a vehicle cabin such that longitudinal directions of the rockers run along the vehicle longitudinal direction, and both vehicle transverse direction end portions of the vehicle transverse direction frame member, which extends substantially horizontally toward vehicle transverse direction outer sides, may be joined to the left and right rockers.

In the above-described structure, the vehicle transverse direction frame member, which is disposed such that the longitudinal direction thereof runs along the vehicle transverse direction, is provided in the concave portions which are formed at the vehicle top-bottom direction intermediate portions of the connecting frame portions at the left and right front side members. As a result, the position of the vehicle transverse direction frame member is near the left and right rockers which are at the vehicle lower side, and the both vehicle transverse direction end portions of the vehicle transverse direction frame member, which extends substantially horizontally toward the vehicle transverse direction outer sides, can be joined to the left and right rockers. Therefore, a portion of the load, which is inputted the front frame portions of the front side members at the time of a front collision of the vehicle, is transmitted to the vehicle transverse direction frame member from the connecting frame portions of the front side members, and is transmitted to the rockers to which are joined the both vehicle transverse direction end portions of the vehicle transverse direction frame member which extends substantially horizontally toward the vehicle transverse direction outer sides. Namely, at the time of a front collision of the vehicle, a portion of the load, which is applied to the front side members from the vehicle front side, is rectilinearly transmitted in the vehicle transverse direction by the both vehicle transverse direction end portions of the vehicle transverse direction frame member, and this load can be directly received at the rockers. As a result, the load is transmitted efficiently to the rockers.

The vehicle front structure having the above-described structure can efficiently transmit, to the rockers, the load which is applied to the front side members at the time of a front collision of the vehicle.

The vehicle front structure of the first aspect of the present invention may further have a reinforcing member which is provided at a top portion of a floor tunnel portion such that a longitudinal direction of the reinforcing member runs along the vehicle longitudinal direction, and a front portion of the reinforcing member is joined to a vehicle transverse direction intermediate portion of the vehicle transverse direction frame member, and the reinforcing member supports, from a vehicle rear side, the vehicle transverse direction intermediate portion of the vehicle transverse direction frame member.

In the above-described structure, a portion of the load, which is inputted to the front frame portions of the front side members at the time of a front collision of the vehicle, is transmitted to the vehicle transverse direction frame member, and is transmitted to the reinforcing member which is provided at the top portion of the floor tunnel portion such that the longitudinal direction of the reinforcing member runs along the vehicle longitudinal direction. Further, the front portion of the reinforcing member is joined to the vehicle transverse direction intermediate portion of the vehicle transverse direction frame member, and supports the vehicle transverse direction intermediate portion of the vehicle transverse direction frame member from the rear side of the vehicle. As a result, load from the vehicle transverse direction frame member can be received by the axial force of the reinforcing member, due to the reinforcing member which is provided at the top portion of the floor tunnel portion which has little offset, in the vehicle top-bottom direction, from the vehicle transverse direction frame member. Therefore, a portion of the load, which is inputted to the front side members at the time of a front collision of the vehicle, is efficiently transmitted via the vehicle transverse direction frame member to the reinforcing member which is provided at the floor tunnel portion.

The vehicle front structure having the above-described structure can efficiently transmit, to the reinforcing member which is provided at the floor tunnel portion, the load which is applied to the front side members at the time of a front collision of the vehicle.

The vehicle front structure having the above-described structure may further have a dash panel which separates a vehicle cabin and an engine room, and a front end portion of the reinforcing member extends toward a front of the vehicle and is joined to the dash panel.

A portion of the load from the engine room side, which is applied to the dash panel which separates the vehicle cabin and the engine room, can be directly supported by the axial force of the reinforcing member whose front end portion extends toward the front of the vehicle and which is joined to the dash panel. Therefore, deformation of the dash panel at the time of a front collision of the vehicle is suppressed.

The vehicle front structure having the above-described structure can suppress deformation of the dash panel at the time of a front collision of the vehicle.

DETAILED DESCRIPTION OF THE INVENTION

Figure 1:
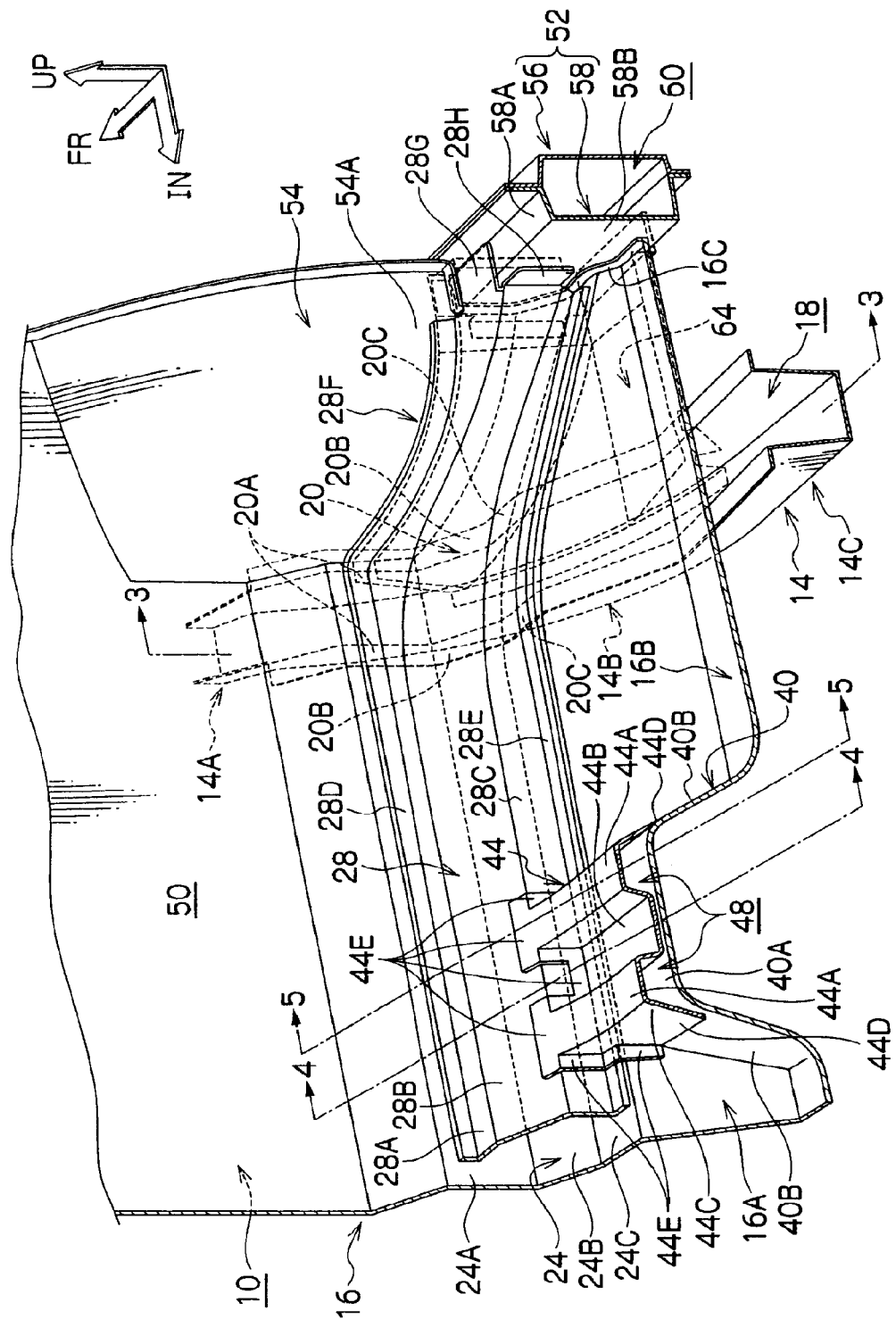
FIG. 1 is a perspective view seen obliquely from the rear and the inner side of the vehicle, and showing a vehicle front structure relating to a first exemplary embodiment of the present invention.

A first exemplary embodiment of a vehicle front structure of the present invention will be described in accordance with FIG. 1 through FIG. 6.

Note that arrow UP in the drawings indicates the upward direction of the vehicle, arrow FR in the drawings indicates the frontward direction of the vehicle, and arrow IN in the drawings indicates the direction inward in the transverse direction of the vehicle.

A vehicle front structure relating to an exemplary embodiment of the present invention is shown in FIG. 1 in a perspective view seen obliquely from the rear and the inner side of the vehicle. The vehicle front structure relating to the exemplary embodiment of the present invention is shown in FIG. 2 in an exploded perspective view seen obliquely from the rear and the inner side of the vehicle.

Figure 2:
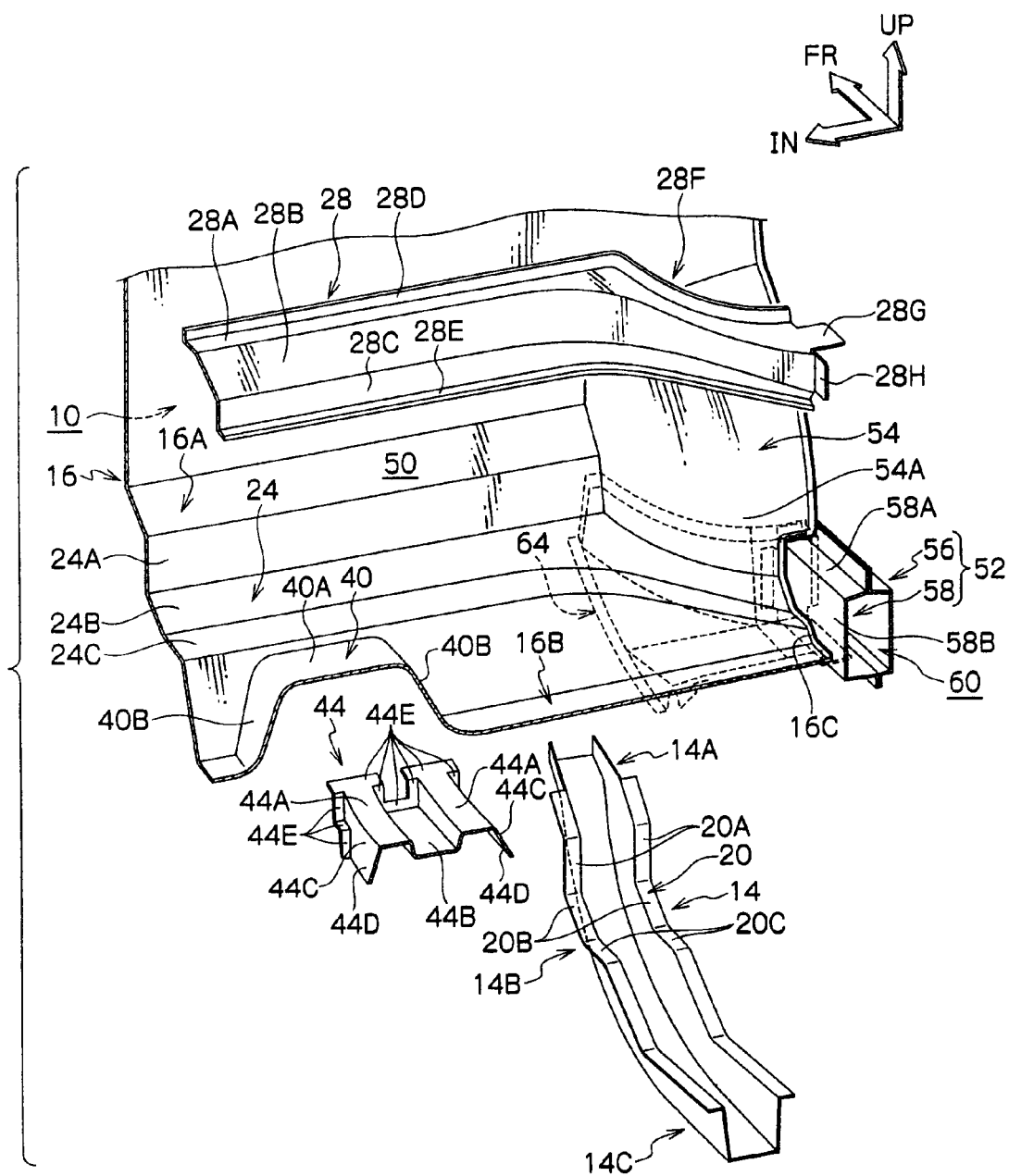
FIG. 2 is an exploded perspective view seen obliquely from the rear and the inner side of the vehicle, and showing the vehicle front structure relating to the first exemplary embodiment of the present invention.

As shown in FIG. 1 and FIG. 2, in the vehicle body of an automobile in the present exemplary embodiment, front portions 14A, which serve as front frame portions, of left and right front side members 14 are disposed such that the longitudinal directions thereof run along the vehicle longitudinal direction, in vicinities of the lower portions of the both vehicle transverse direction ends of an engine room 10 which is the front portion of the vehicle body. Note that only the front side member 14 which is at the right side of the vehicle is shown in FIG. 1 and FIG. 2.

Figure 3:
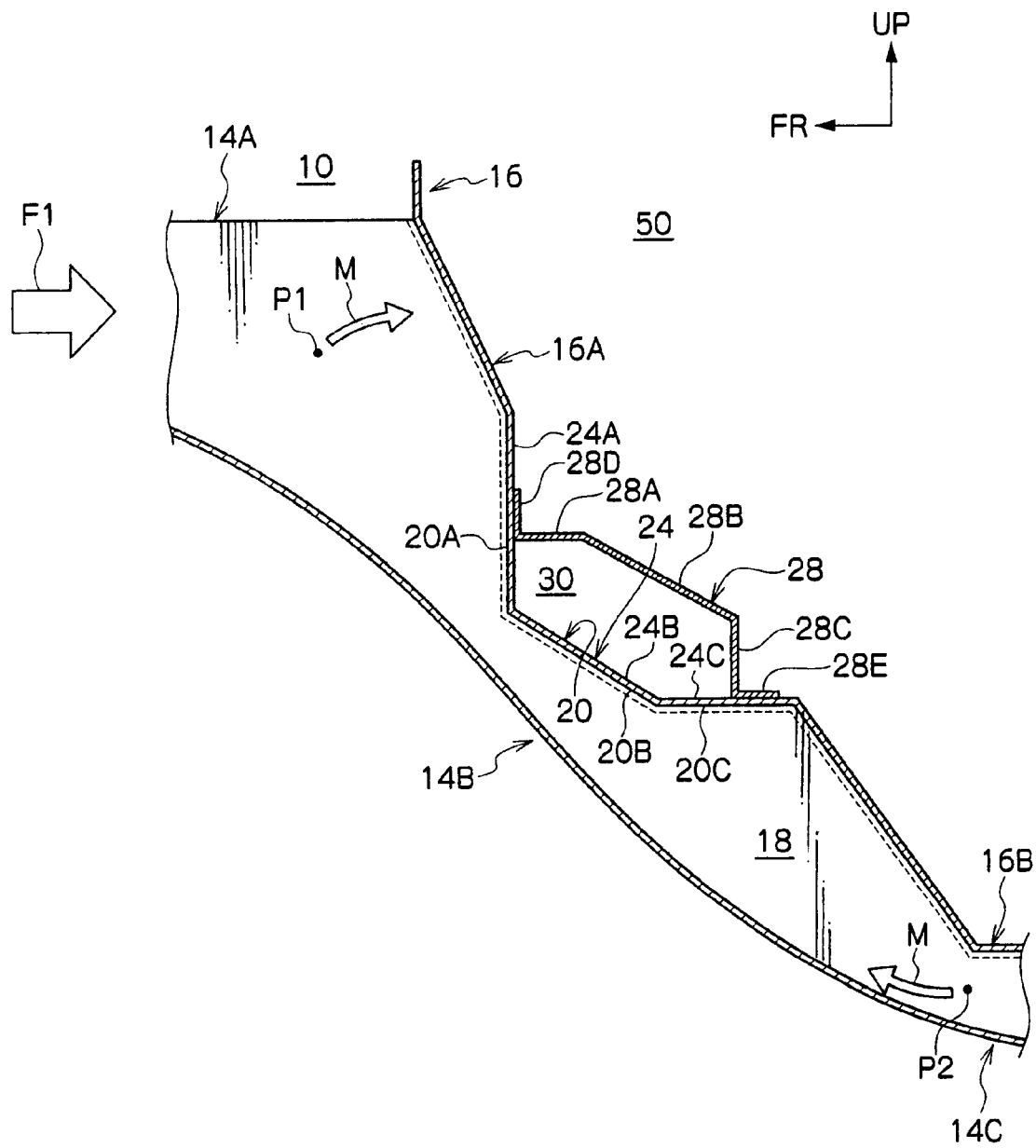
FIG. 3 is an enlarged cross-sectional view along cross-section line 3-3 of FIG. 1.

An expanded cross-sectional view along cross-section line 3-3 of FIG. 1 is shown in FIG. 3.

As shown in FIG. 3, a kick portion 14B, which serves as a connecting frame portion and is inclined from the vehicle front upper side toward the vehicle rear lower side, is formed at the vehicle longitudinal direction intermediate portion of the front side member 14. A rear portion 14C serving as a rear frame portion extends toward the rear of the vehicle from the lower end (rear end) of the kick portion 14B.

As shown in FIG. 2, the cross-sectional configuration, as seen from the longitudinal direction, of the kick portion 14B and the rear portion 14C of the front side member 14 is a hat-shaped cross-sectional configuration whose opening portion is directed toward the top of the vehicle.

As shown in FIG. 1, the kick portion 14B of the front side member 14 is joined to the engine room side surface of an inclined wall portion 16A of a dash panel 16 which separates the engine room 10 and a vehicle cabin 50. The rear portion 14C of the front side member 14 is joined to the bottom surface of a lower wall portion 16B of the dash panel 16. Accordingly, a closed cross-section structure 18 is formed by the front side member 14 and the dash panel 16.

Note that a closed cross-section structure is a cross-section structure which is high-strength and highly-rigid and in which the outer peripheral portion of the opening of the cross-section which is the object is substantially continuous. Substantially means that there are also included structures in which, even if holes or the like which are small as compared with the outer peripheral length are formed locally in the cross-section which is the object, there are no holes or the like and the member at the periphery of the opening portion is continuous at the near side or the far side of (the direction orthogonal to) the cross-section.

As shown in FIG. 3, a concave portion 20 which is recessed toward the outer side of the vehicle cabin (obliquely downward and toward the vehicle front side) is formed in the top-bottom direction intermediate portion of the kick portion 14B of the front side member 14. Further, the configuration of the concave portion 20 as seen from the vehicle transverse direction is a trapezoidal configuration having front wall portions 20A running along the vehicle top-bottom direction, floor wall portions 20B extending downward toward the rear of the vehicle from the lower ends of the front wall portions 20A, and rear wall portions 20C extending toward the rear of the vehicle from the lower ends of the floor wall portions 20B.

On the other hand, a concave portion 24 which is recessed toward the outer side of the vehicle cabin (obliquely downward and toward the vehicle front side) is formed in the region of the inclined wall portion 16A of the dash panel 16, which region is joined to the concave portion 20 of the front side member 14. The concave portion 24 is formed continuously and substantially horizontally in the vehicle transverse direction along the dash panel 16. Further, the configuration of the concave portion 24 as seen from the vehicle transverse direction is a trapezoidal configuration having a front wall portion 24A running along the vehicle top-bottom direction, a floor wall portion 24B extending downwardly toward the rear of the vehicle from the lower end of the front wall portion 24A, and a rear wall portion 24C extending toward the rear of the vehicle from the lower end of the floor wall portion 24B.

Accordingly, the concave portion 24, which is formed at the inclined wall portion 16A of the dash panel 16, is joined from the vehicle cabin inner side to the concave portion 20 which is formed at the kick portion 14B of the front side member 14. Further, a dash cross member 28 serving as a vehicle transverse direction frame member is provided at the interiors of the concave portion 24 of the dash panel 16 and the concave portions 20 of the front side members 14. The dash cross member 28 has a cross-sectional configuration which hardly projects-out at all from the concave portion 24 and the concave portions 20 into the vehicle cabin 50.

The vehicle transverse direction frame member is a member which is disposed such that the longitudinal direction thereof runs along the vehicle transverse direction, and which structures the frame of the vehicle body.

The dash cross member 28 is disposed substantially horizontally along the vehicle transverse direction. The configuration of the dash cross member 28 as seen from the vehicle transverse direction is a trapezoidal shape having a front wall portion 28A running along the vehicle longitudinal direction, an inclined wall portion 28B extending downward toward the rear of the vehicle from the rear end of the front wall portion 28A, and a rear wall portion 28C extending toward the bottom of the vehicle from the rear end of the inclined wall portion 28B.

Further, a flange 28D is formed toward the top of the vehicle from the front end of the front wall portion 28A of the dash cross member 28. The flange 28D is joined by welding or the like to the rear surface of the front wall portion 24A of the concave portion 24 and to the rear surfaces of the front wall portions 20A of the concave portion 20. On the other hand, a flange 28E is formed toward the rear of the vehicle from the lower end of the rear wall portion 28C of the dash cross member 28. The flange 28E is joined by welding or the like to the top surface of the rear wall portion 24C of the concave portion 24 and to the top surfaces of the rear wall portions 20C of the concave portion 20. Therefore, a closed cross-section structure 30, which is hexagonal in cross-section and which extends in the vehicle transverse direction, is formed by the dash cross member 28 and the concave portion 24 of the dash panel 16.

Accordingly, the amount by which the dash cross member 28 projects-out toward the inner side of the vehicle cabin can be suppressed by providing the dash cross member 28 at the interiors of the concave portion 24 of the dash panel 16 and the concave portions 20 of the front side members 14. Therefore, narrowing of the space within the vehicle cabin by the dash cross member 28 can be suppressed.

Further, by forming the concave portion 20 at the kick portion 14B of the front side member 14, the cross-sectional area of the closed cross-section structure 18, which is formed by the kick portion 14B of the front side member 14 and the inclined wall portion 16A of the dash panel 16, becomes small. However, because the dash cross member 28 is disposed within the concave portion 20 and the closed cross-section structure 30 is formed, the strength and rigidity of the closed cross-section structure 18 can be ensured by the dash cross member 28.

Further, at the time of a front collision of the vehicle, a vertical bending moment (arrows M in FIG. 3), whose peak values are at the upper end (in a vicinity of a cross-section center P1) and the lower end (in a vicinity of a cross-section center P2) of the kick portion 14B, arises at the front side member 14 due to the load (arrow F1 in FIG. 3) which is inputted to the front portion 14A of the front side member 14.

At this time, the concave portion 20 is formed at the position where the vertical bending moment M becomes zero (M=0) which is an intermediate position between the upper end P1 and the lower end P2 which become the peak values of the vertical bending moment M at the kick portion 14B of the front side member 14, and the dash cross member 28 is joined to the interior of this concave portion 20. Therefore, it is difficult for the strength with respect to the vertical bending moment M to be affected by the reduction in the cross-section arising due to the formation of the concave portion 20 in the front side member 14. Moreover, the reduction in the space within the vehicle cabin 50 due to projecting-out of the cross-section of the closed cross-section structure 30 of the dash cross member 28 can be made to be small.

As shown in FIG. 2, a floor tunnel portion 40 which swells toward the top of the vehicle is formed at the lower portion of the inclined wall portion 16A of the dash panel 16 and at the vehicle transverse direction central portion of the lower wall portion 16B, such that the longitudinal direction of the floor tunnel portion 40 runs along the vehicle longitudinal direction. Inclined side wall portions 40B are formed downwardly toward the outer sides in the vehicle transverse direction from both vehicle transverse direction ends of a top wall portion 40A of the floor tunnel portion 40.

As shown in FIG. 1, a tunnel reinforcement 44 serving as a reinforcing member is provided at the top portion of the floor tunnel portion 40, such that the longitudinal direction of the tunnel reinforcement 44 runs along the vehicle longitudinal direction.

As shown in FIG. 2, the cross-sectional configuration of the tunnel reinforcement 44 as seen from the vehicle longitudinal direction is a convex and concave shape which has, at the vehicle transverse direction both side portions, convex portions 44A swelling-out toward the top of the vehicle, and whose vehicle transverse direction central portion is a concave portion 44B.

As shown in FIG. 1, lower portions 44D of left and right side wall portions 44C of the tunnel reinforcement 44 are joined by welding or the like to the vehicle transverse direction outer side surfaces of the upper portions of the inclined side wall portions 40B. The concave portion 44B of the tunnel reinforcement 44 is joined by welding or the like to the top surface of the top wall portion 40A of the floor tunnel portion 40.

Accordingly, the tunnel reinforcement 44 together with the floor tunnel portion 40 forms left and right closed cross-section portions 48 which extends in the vehicle longitudinal direction.

As shown in FIG. 2, a flange 44E is formed so as to be continuous with the peripheral edge portion of the front end of the tunnel reinforcement 44.

As shown in FIG. 1, the flange 44E of the tunnel reinforcement 44 is joined by welding or the like to the dash cross member 28 and to the inclined wall portion 16A of the dash panel 16.

Figure 4:
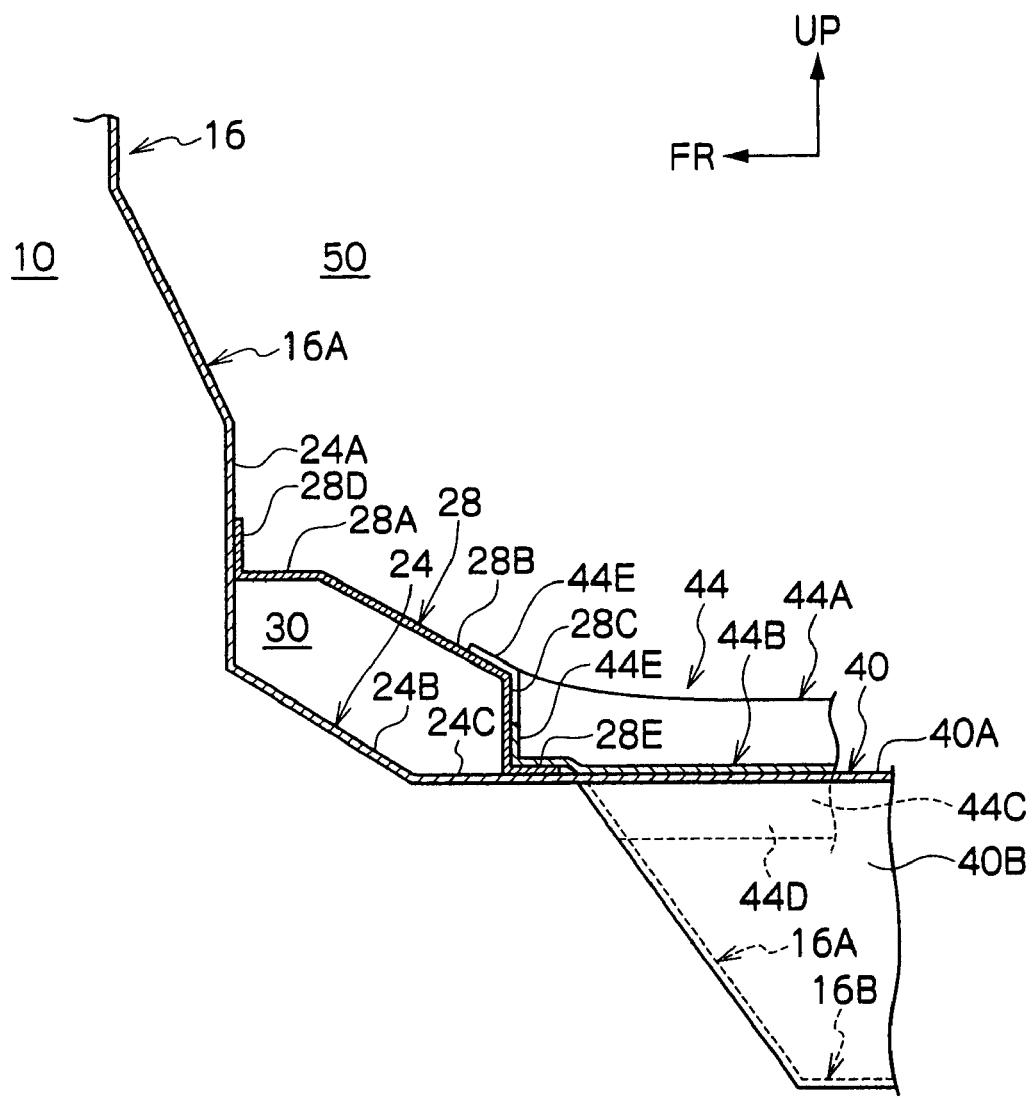
FIG. 4 is an enlarged cross-sectional view along cross-section line 4-4 of FIG. 1.
Figure 5:
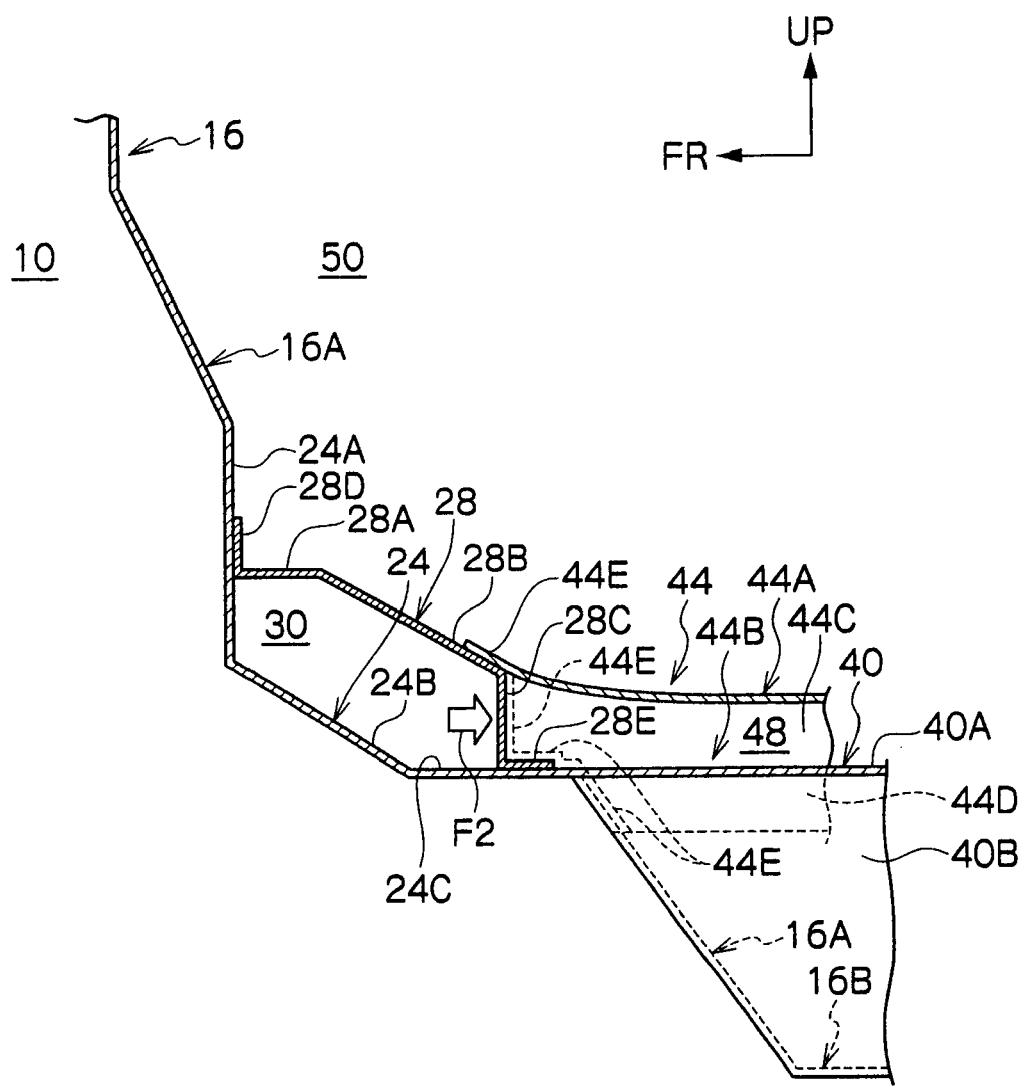
FIG. 5 is an enlarged cross-sectional view along cross-section line 5-5 of FIG. 1.

An enlarged cross-sectional view along cross-section line 4-4 of FIG. 1 is shown in FIG. 4, and an enlarged cross-sectional view along cross-section line 5-5 of FIG. 1 is shown in FIG. 5.

As shown in FIG. 4, the flange 44E, which is formed at the front end of the concave portion 44B of the tunnel reinforcement 44, is joined by welding or the like to the rear surface of the rear wall portion 28C of the dash cross member 28.

As shown in FIG. 5, the flange 44E, which is formed at the front ends of the convex portions 44A of the tunnel reinforcement 44, is joined by welding or the like to the rear portion of the top surface of the inclined wall portion 28B, the rear surface of the rear wall portion 28C and the top surface of the flange 28E of the dash cross member 28, and to the rear surface of the inclined wall portion 16A of the dash panel 16.

Accordingly, the front ends of the left and right closed cross-section portions 48, which are formed by the tunnel reinforcement 44 and the floor tunnel portion 40, are joined from the vehicle rear side to the vehicle transverse direction intermediate portion of the closed cross-section structure 30. The left and right closed cross-section portions 48 support, from the vehicle rear side, the closed cross-section structure 30 which is formed by the dash cross member 28 and the dash panel 16.

Accordingly, the load (arrow F2 in FIG. 5) from the dash cross member 28 can be received by the axial force of the tunnel reinforcement 44. Therefore, a portion (arrow F2 in FIG. 5) of the load (arrow F1 in FIG. 3) which is inputted to the front portions 14A of the front side members 14 at the time of a front collision of the vehicle is efficiently transmitted to the tunnel reinforcement 44 provided at the floor tunnel portion 40.

As shown in FIG. 1, left and right rockers 52 are disposed at the lower portions of the vehicle transverse direction outer sides of the vehicle cabin 50, such that the longitudinal directions of the rockers 52 run along the vehicle longitudinal direction. Note that only the rocker 52 at the right side of the vehicle is shown in FIG. 1 and FIG. 2.

Both vehicle transverse direction end portions 28F of the dash cross member 28 extend substantially horizontally toward the vehicle transverse direction outer sides. Further, the both vehicle transverse direction end portions 28F of the dash cross member 28 are curved toward the vehicle rear side along rear wall portions 54A of wheel houses 54, and are joined by welding or the like to the rear surfaces of the rear wall portions 54A of the wheel houses 54.

Figure 6:
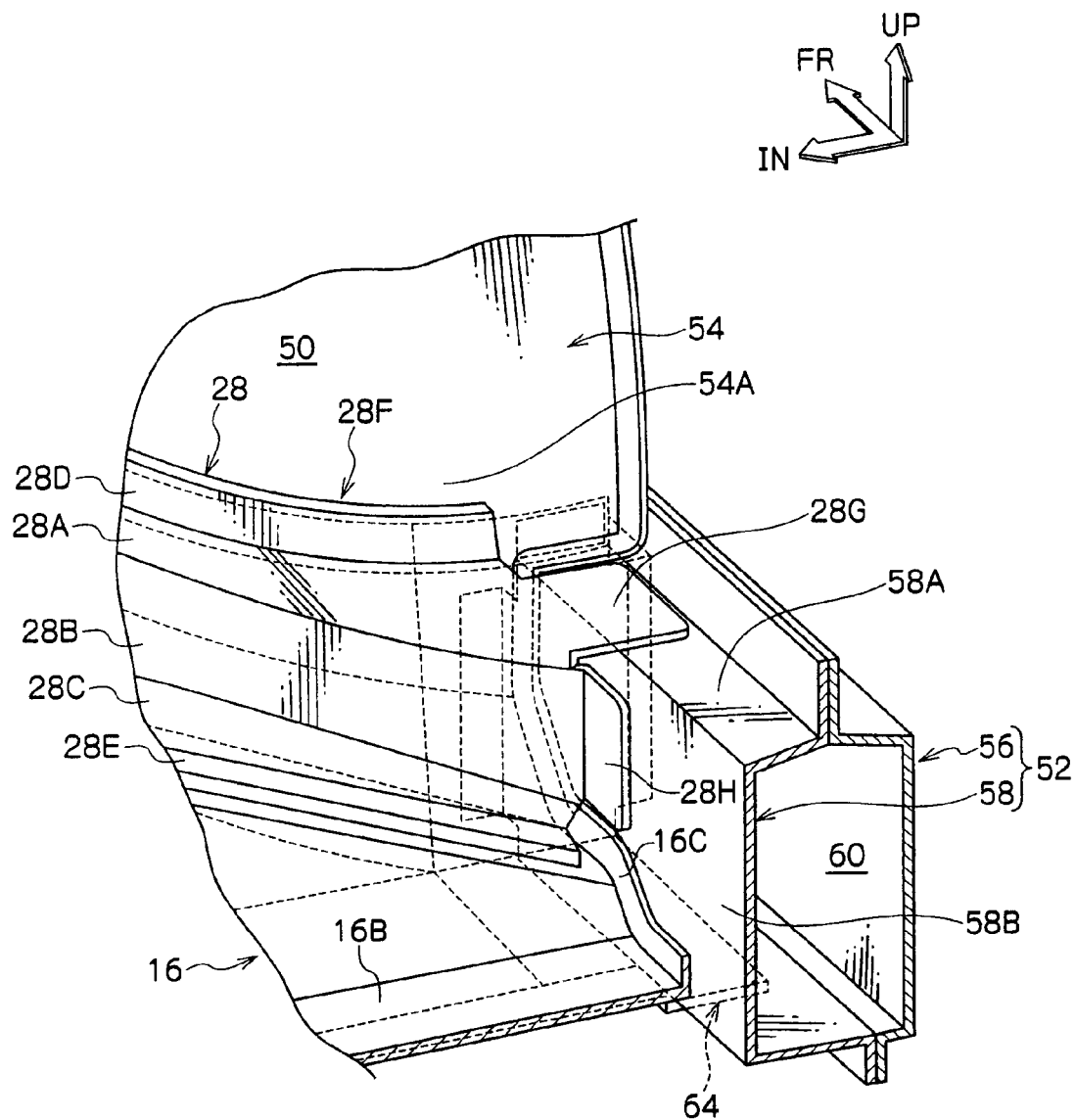
FIG. 6 is an enlarged perspective view seen obliquely from the rear and the inner side of the vehicle, and showing a vehicle transverse direction end portion of the vehicle front structure relating to the first exemplary embodiment of the present invention.

The vehicle transverse direction end portion 28F of the dash cross member 28 is shown in FIG. 6 in an enlarged perspective view seen obliquely from the rear and the inner side of the vehicle.

As shown in FIG. 6, the rocker 52 has a rocker outer panel 56 which structures the vehicle transverse direction outer side portion of the rocker 52, and a rocker inner panel 58 which structures the vehicle transverse direction inner side portion of the rocker 52. The rocker 52 forms a closed cross-section structure 60 which has a rectangular cross-sectional configuration and whose longitudinal direction is the vehicle longitudinal direction.

On the other hand, a flange 28 G, which extends toward the vehicle transverse direction outer side, is formed from the vehicle transverse direction outer side end portion of the front wall portion 28A of the dash cross member 28. The flange 28G is joined by welding or the like to the top surface of an upper wall portion 58A of the rocker inner panel 58. Further, a flange 28H, which extends toward the rear of the vehicle, is formed from the vehicle transverse direction outer side end portion of the inclined wall portion 28B of the dash cross member 28. The flange 28H is joined by welding or the like to the vehicle transverse direction inner side surface of a vehicle transverse direction inner side wall portion 58B of the rocker inner panel 58.

Note that a flange 16C is formed toward the vehicle cabin inner side, at the vehicle transverse direction outer side edge portion of the dash panel 16. The flange 16C is joined by welding or the like to the vehicle transverse direction inner side surface of the vehicle transverse direction inner side wall portion 58B of the rocker inner panel 58.

Accordingly, a portion of the load (arrow F1 in FIG. 3), which is applied from the vehicle front side at the time of a front collision of the vehicle, is rectilinearly transmitted in the vehicle transverse direction by the both vehicle transverse direction end portions 28F of the dash cross member 28 which extends substantially horizontally toward the outer sides in the vehicle transverse direction, and this load can be directly received at the rockers 52. As a result, a portion of the collision load is efficiently transmitted to the rockers 52.

As shown in FIG. 1, an outer torque box 64 is disposed at the vehicle bottom side of each of the both vehicle transverse direction end portions 28F of the dash cross member 28. The outer torque box 64 connects the front side member 14 and the rocker 52 at the vehicle cabin outer side of the dash panel 16.

Operation of the present exemplary embodiment will be described next.

In the present exemplary embodiment, the concave portions 20, which are recessed toward the vehicle cabin outer side, are formed in the vehicle top-bottom direction intermediate portions of the kick portions 14B of the left and right front side members 14. The dash cross member 28, which is disposed such that the longitudinal direction thereof runs along the vehicle transverse direction, is provided within the concave portions 20 so as to sandwich the concave portion 24 formed at the dash panel 16.

As a result, in the present exemplary embodiment, the amount by which the dash cross member 28, which is provided at the vehicle cabin 50 side of the dash panel 16, projects-out into the vehicle cabin can be suppressed. Therefore, narrowing of the space within the vehicle cabin 50 by the dash cross member 28 can be suppressed, and space within the vehicle cabin can be ensured.

Further, at the time of a front collision of the vehicle, a vertical bending moment (arrows M in FIG. 3), whose peak values are at the upper end (in a vicinity of the cross-section center P1) and the lower end (in a vicinity of the cross-section center P2) of the kick portion 14B, arises at the front side member 14 due to the load (arrow F1 in FIG. 3) which is inputted to the front portion 14A of the front side member 14 which is disposed such that the longitudinal direction thereof runs along the vehicle longitudinal direction.

At this time, in the present exemplary embodiment, the dash cross member 28 is joined to the interior of the concave portion 24 which is formed at the position where the vertical bending moment M becomes zero (M=0) which is an intermediate position between the upper end P1 and the lower end P2 which become the peak values of the vertical bending moment M at the kick portion 14B of the front side member 14. Therefore, it is difficult for the strength with respect to the vertical bending moment M to be affected by the reduction in the cross-section arising due to the formation of the concave portion 20 in the front side member 14. Moreover, the reduction in the space within the vehicle cabin 50 due to projecting-out of the cross-section of the closed cross-section structure 30 of the dash cross member 28 can be made to be small. Still further, at the front side member 14, whose cross-sectional area is reduced and whose strength is decreased, the concave portion 20 can be reinforced by the closed cross-section structure 30 of the dash cross member 28.

Accordingly, in the present exemplary embodiment, space within the vehicle cabin can be ensured, and deformation of the left and right front side members 14, which arises at the time of a front collision of the vehicle, can be suppressed.

Further, in the present exemplary embodiment, the load F1, which is inputted to the front portions 14A of the left and right front side members 14 at the time of a front collision of the vehicle, is transmitted to the dash cross member 28, and is transmitted to the left and right rockers 52 to which are joined the both vehicle transverse direction end portions 28F of the dash cross member 28 which extends substantially horizontally toward the vehicle transverse direction outer sides.

Therefore, a portion of the load F1, which is applied from the front side of the vehicle at the time of a front collision of the vehicle, is rectilinearly transmitted in the vehicle transverse direction by the both vehicle transverse direction end portions 28F of the dash cross member 28 which extends substantially horizontally toward the vehicle transverse direction outer sides, and this load can be directly received at the rockers 52. As a result, a portion of the load F1 is efficiently transmitted to the rockers 52.

Further, in the present exemplary embodiment, a portion of the load F1, which is inputted to the front portions 14A of the left and right front side members 14 at the time of a front collision of the vehicle, is transmitted to the dash cross member 28, and is transmitted to the tunnel reinforcement 44 which is provided at the top portion of the floor tunnel portion 40 such that the longitudinal direction of the tunnel reinforcement 44 runs along the vehicle longitudinal direction. At this time, the front end portion of the tunnel reinforcement 44 is joined, from the vehicle rear side, to the vehicle transverse direction intermediate portion of the dash cross member 28, and the tunnel reinforcement 44 supports the vehicle transverse direction intermediate portion of the dash cross member 28 from the vehicle rear side.

As a result, load (arrow F2 in FIG. 5) from the dash cross member 28 can be received by the axial force of the tunnel reinforcement 44, due to the tunnel reinforcement 44 which is provided at the top portion of the floor tunnel portion 40 which has little offset, in the vehicle top-bottom direction, from the dash cross member 28. Therefore, the portion F2 of the load F1, which is inputted to the front portions 14A of the left and right front side members 14 at the time of a front collision of the vehicle, is efficiently transmitted to the tunnel reinforcement 44 which is provided at the floor tunnel portion 40.

A second exemplary embodiment of the vehicle front structure of the present invention will be described next in accordance with FIG. 7 through FIG. 10.

Note that members which are the same as those of the first exemplary embodiment are denoted by the same reference numerals, and description thereof is omitted.

Figure 7:
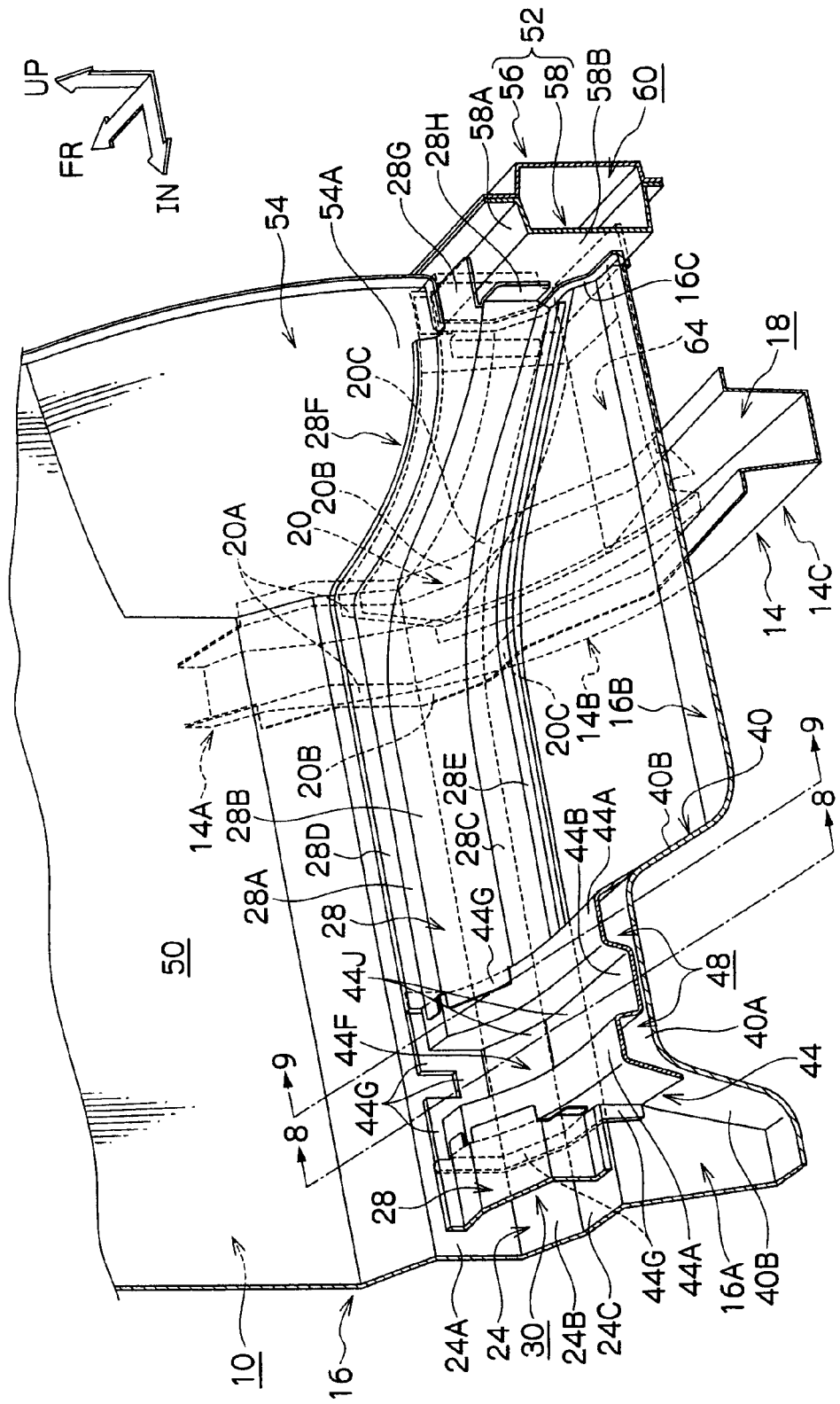
FIG. 7 is a perspective view seen obliquely from the rear and the inner side of the vehicle, and showing a vehicle front structure relating to a second exemplary embodiment of the present invention.

The vehicle front structure relating to the second exemplary embodiment of the present invention is shown in FIG. 7 in a perspective view seen obliquely from the rear and the inner side of the vehicle. A portion of the vehicle front structure relating to the second exemplary embodiment of the present invention is shown in FIG. 10 in an enlarged perspective view seen obliquely from the rear and the inner side of the vehicle. Further, an enlarged cross-sectional view along cross-section line 8-8 of FIG. 7 is shown in FIG. 8, and an enlarged cross-sectional view along cross-section line 9-9 of FIG. 7 is shown in FIG. 9.

As shown in FIG. 7, in the present exemplary embodiment, the dash cross member 28 is divided to the left and the right at the vehicle transverse direction central portion. A front end portion 44F of the tunnel reinforcement 44 extends toward the front of the vehicle, between the dash cross members 28 which are divided to the left and the right. Further, a flange 44G is formed continuously with the peripheral edge portion of the front end portion 44F of the tunnel reinforcement 44.

Figure 8:
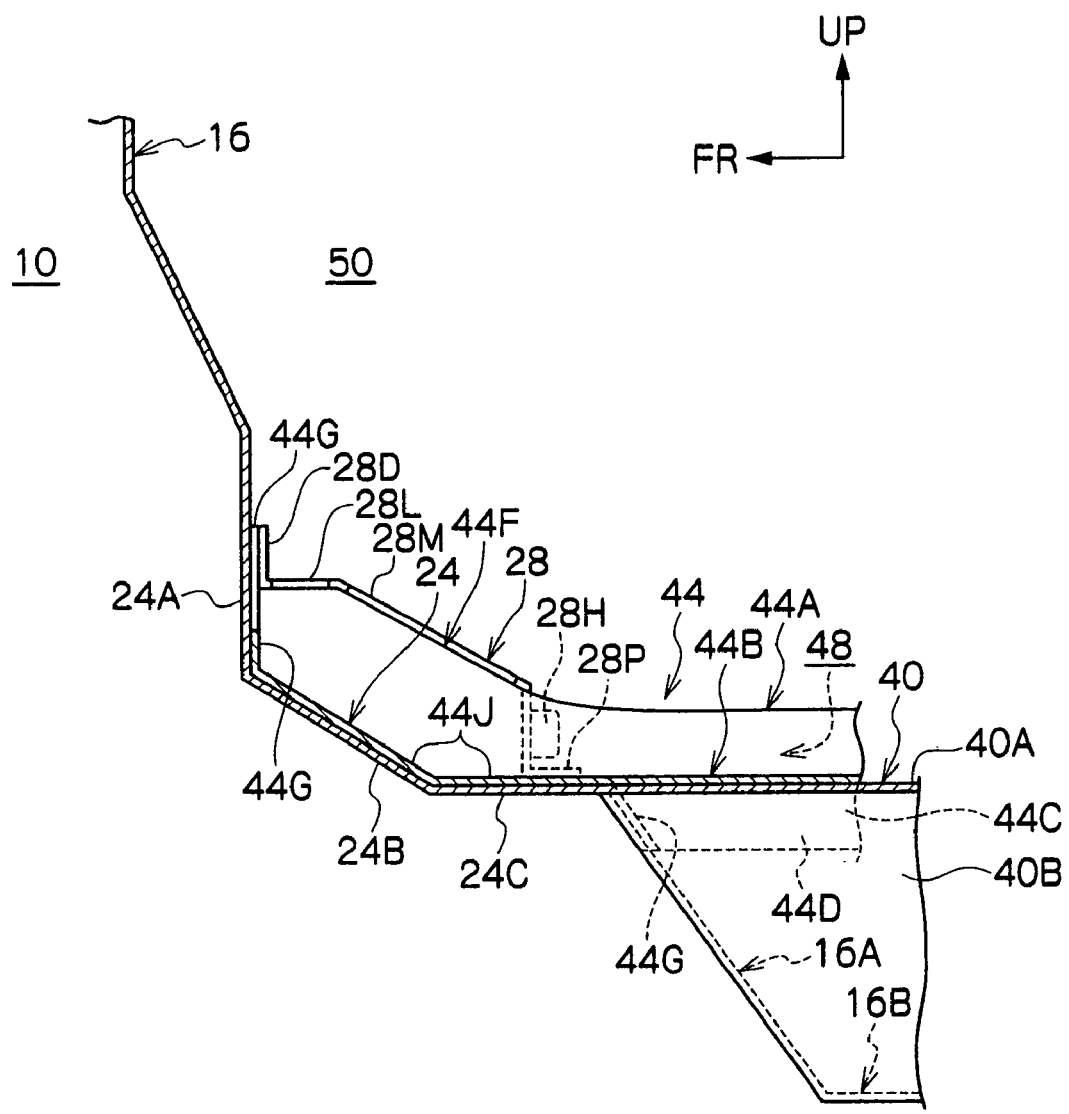
FIG. 8 is an enlarged cross-sectional view along cross-section line 8-8 of FIG. 7.
Figure 9:
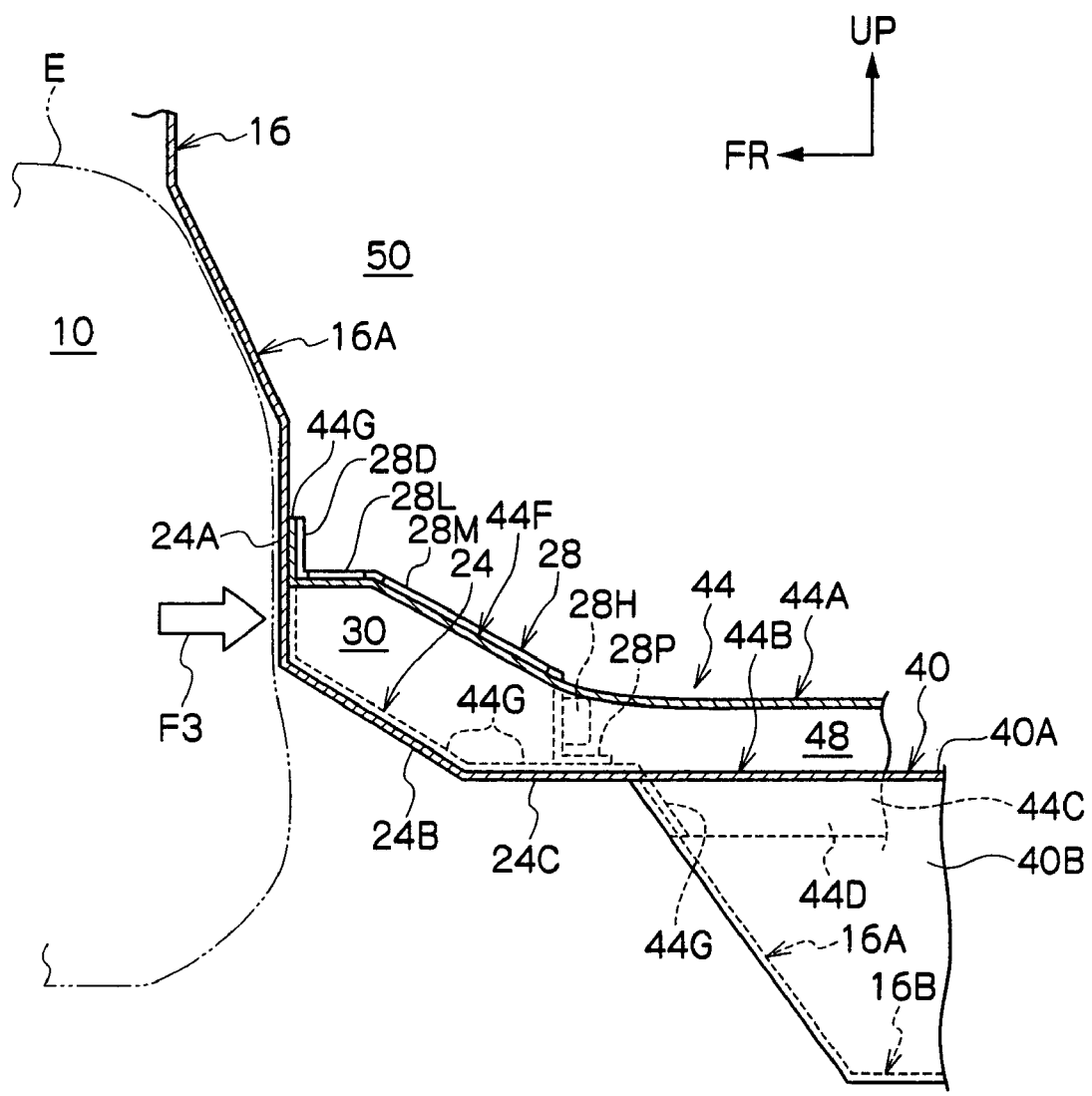
FIG. 9 is an enlarged cross-sectional view along cross-section line 9-9 of FIG. 7.
Figure 10:
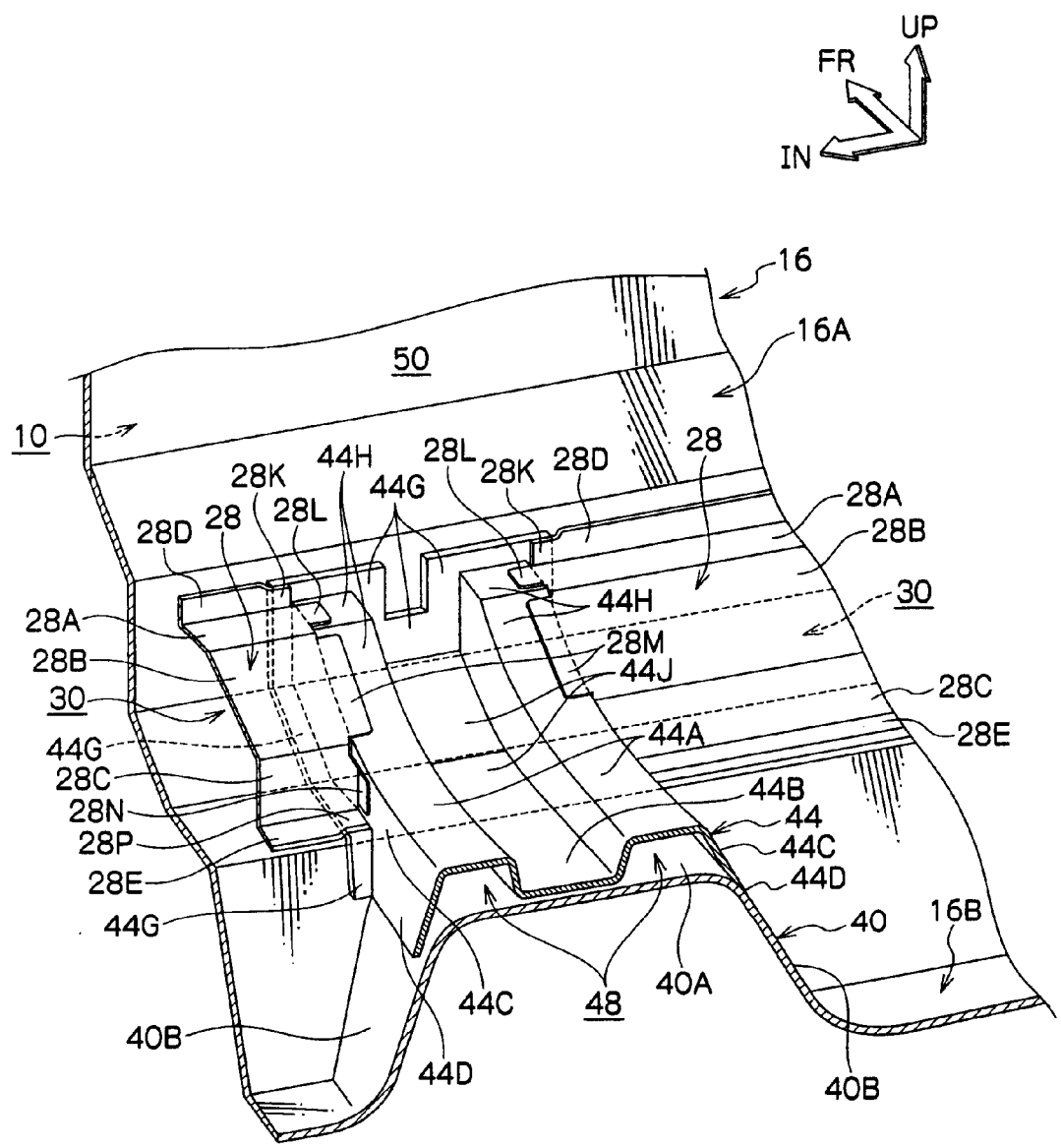
FIG. 10 is an enlarged perspective view seen obliquely from the rear and the inner side of the vehicle, and showing a portion of a vehicle front structure relating to a third exemplary embodiment of the present invention.

As shown in FIG. 8 and FIG. 9, the flange 44G of the front end portion 44F of the tunnel reinforcement 44 is joined by welding or the like to the rear surface of the front wall portion 24A of the concave portion 24 of the dash panel 16. Further, the flange 44G of the tunnel reinforcement 44 is joined by welding or the like to the floor wall portion 24B and the rear wall portion 24C of the concave portion 24 at the dash panel 16, and to the vehicle cabin inner side surface of the inclined wall portion 16A of the dash panel 16.

Accordingly, the front end portions of the left and right closed cross-section portions 48 are joined to the concave portion 24 of the dash panel 16 from the vehicle rear side, and can support the dash panel 16 from the vehicle rear side.

As shown in FIG. 10, at the divided end portions of the dash cross members 28 which are divided to the left and the right, end portions 28K of the flanges 28D are joined by welding or the like to the rear surface of the flange 44G of the tunnel reinforcement 44. Further, end portions 28L of the front wall portions 28A and end portions 28M of the inclined wall portions 28B of the dash cross members 28 are joined by welding or the like to top surfaces 44H of the convex portions 44A of the tunnel reinforcement 44.

Flanges 28N are formed toward the rear of the vehicle at end portions of the rear wall portions 28C of the dash cross members 28. The flanges 28N are joined by welding or the like to the vehicle transverse direction outer side surfaces of the left and right side wall portions 44C of the tunnel reinforcement 44. Further, end portions 28P of the flanges 28E of the dash cross members 28 are joined by welding or the like to the top surface of the flange 44G of the tunnel reinforcement 44.

Further, a front portion 44J of the concave portion 44B of the tunnel reinforcement 44 is joined by welding or the like to the vehicle cabin inner side surfaces of the floor wall portion 24B and the rear wall portion 24C of the concave portion 24 at the dash panel 16.

Therefore, the cross-section structures 30 of the dash cross members 28 which are divided to the left and the right are respectively joined to the front end portions of the left and right closed cross-section portions 48.

Accordingly, in the present exemplary embodiment, in addition to the operation and effects of the first exemplary embodiment, when a part E such as the engine or the like within the engine room 10 moves toward the rear of the vehicle and hits the dash panel 16 during the latter half of the time of a front collision of the vehicle as shown by the two-dot chain line in FIG. 9, a portion of the load (arrow F3 in FIG. 9) from the engine room 10 side which is applied to the dash panel 16 can be directly supported from the rear of the vehicle by the axial forces of the closed cross-section portions 48 of the tunnel reinforcement 44. Therefore, deformation of the dash panel 16 toward the vehicle cabin inner side during the latter half of the time of a front collision of the vehicle can be suppressed. Further, the load applied to the closed cross-section structures 30 of the dash cross members 28 also is reduced.

A third exemplary embodiment of the vehicle front structure of the present invention will be described next in accordance with FIG. 11.

Note that members which are the same as those of the second exemplary embodiment are denoted by the same reference numerals, and description thereof is omitted.

Figure 11:
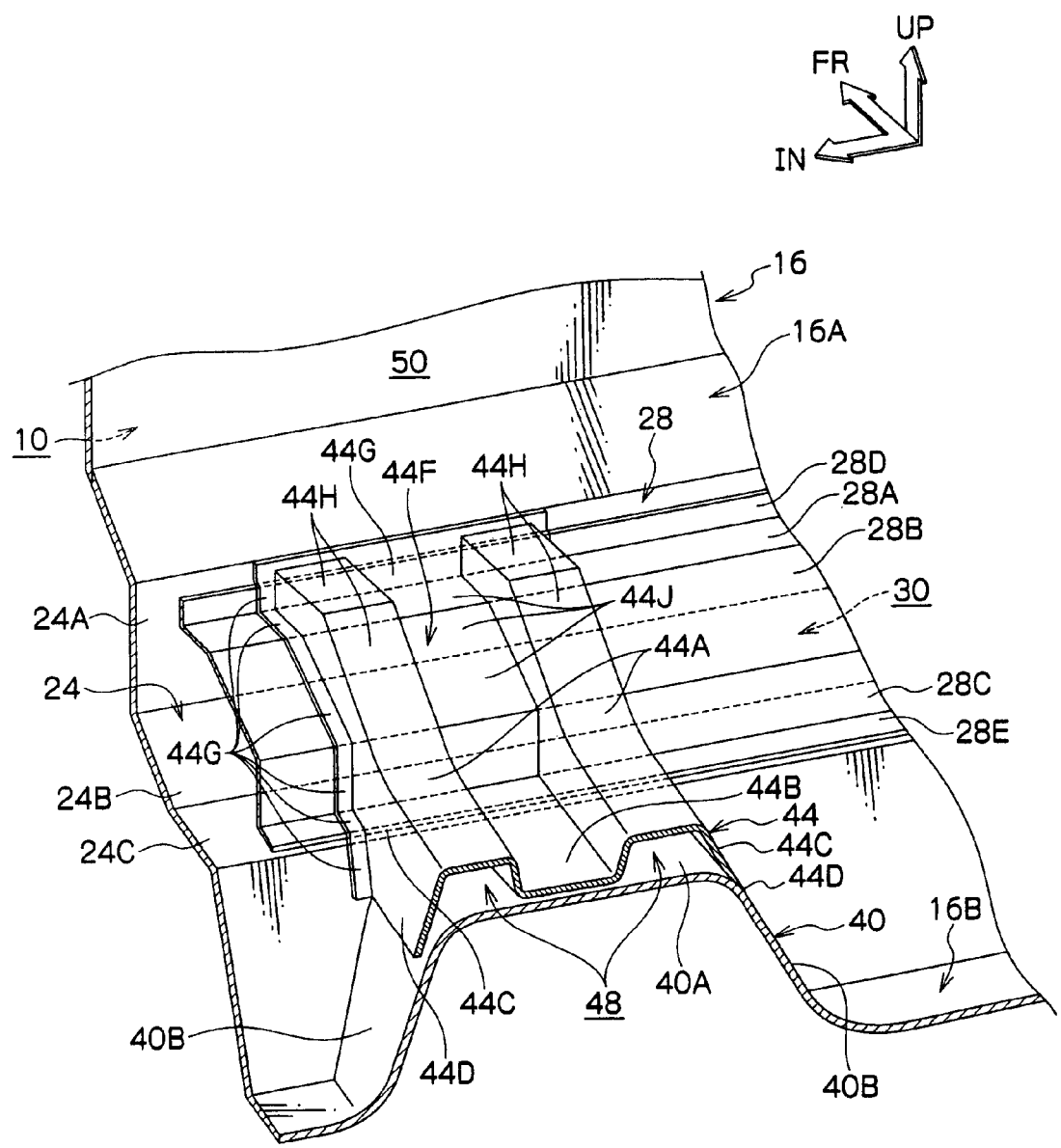
FIG. 11 is an enlarged perspective view seen obliquely from the rear and the inner side of the vehicle, and showing a portion of a vehicle front structure relating to a fourth exemplary embodiment of the present invention.

A portion of the vehicle front structure relating to the third exemplary embodiment of the present invention is shown in FIG. 11 in an enlarged perspective view seen obliquely from the rear and the inner side of the vehicle.

As shown in FIG. 11, in the present exemplary embodiment, differently from the second exemplary embodiment (and in the same way as in the first exemplary embodiment), the central portion of the dash cross member 28 is continuous in the vehicle transverse direction.

Therefore, the flange 44G, which is formed continuously with the peripheral edge portion of the front end portion 44F of the tunnel reinforcement 44, and the front portion 44J of the concave portion 44B are joined by welding or the like to the vehicle cabin inner side surface of the dash cross member 28. As a result, the front end portions of the left and right closed cross-section portions 48 are joined from the vehicle rear side to the upper portion of the concave portion 24 of the dash panel 16.

Therefore, when a part such as the engine or the like within the engine room 10 moves toward the rear of the vehicle and hits the dash panel 16 during the latter half of the time of a front collision of the vehicle, a portion of the load from the engine room 10 side which is applied to the dash panel 16 can be directly supported from the rear of the vehicle by the axial forces of the closed cross-section portions 48 of the tunnel reinforcement 44.

Accordingly, operation and effects which are similar to those of the second exemplary embodiment are obtained by the present exemplary embodiment as well.

A fourth exemplary embodiment of the vehicle front structure of the present invention will be described next in accordance with FIG. 12.

Note that members which are the same as those of the third exemplary embodiment are denoted by the same reference numerals, and description thereof is omitted.

Figure 12:
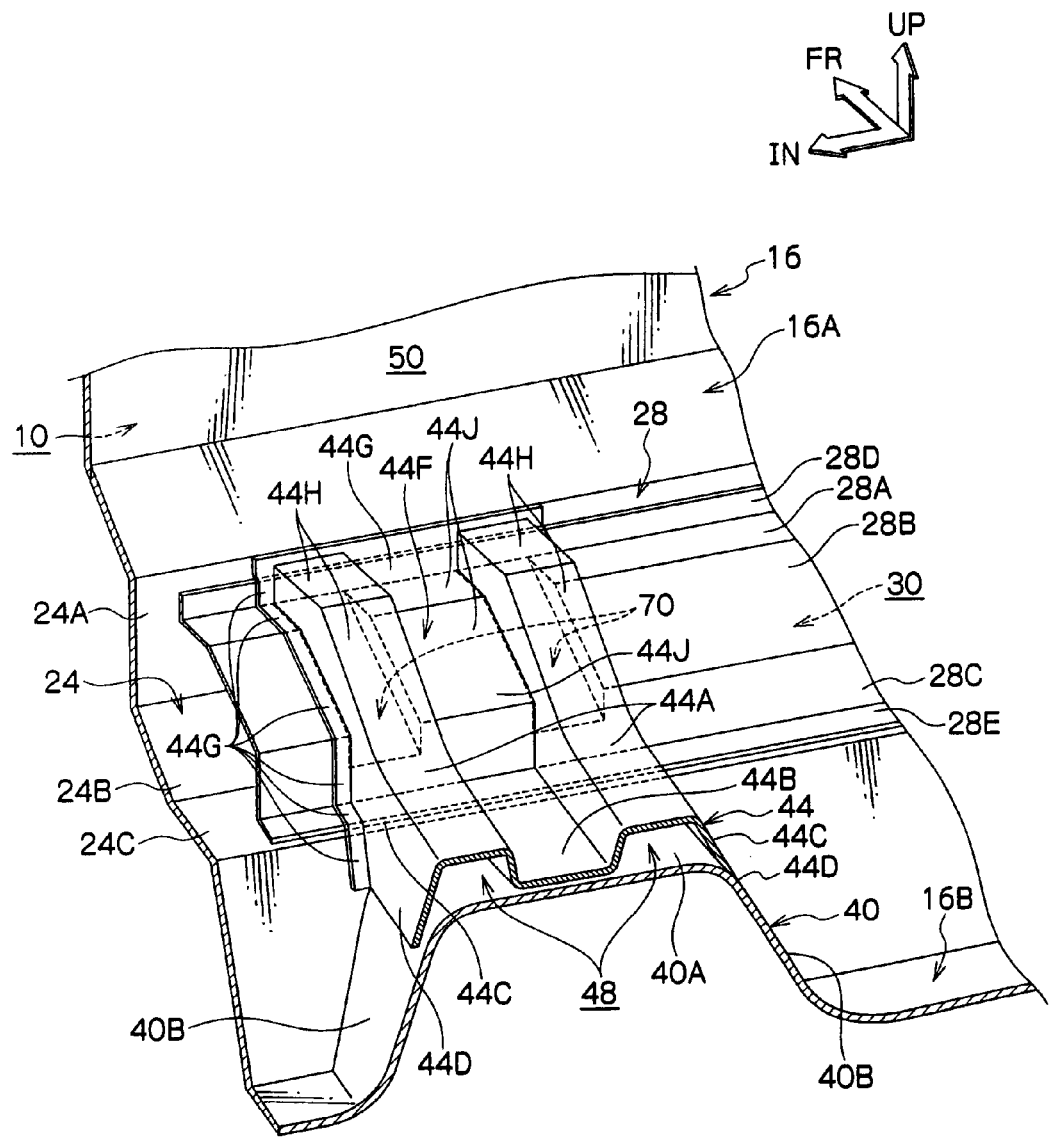
FIG. 12 is an enlarged perspective view seen obliquely from the rear and the inner side of the vehicle, and showing a portion of a vehicle front structure relating to a fifth exemplary embodiment of the present invention.

A portion of a vehicle front structure relating to the fourth exemplary embodiment of the present invention is shown in FIG. 12 in an enlarged perspective view seen obliquely from the rear and the inner side of the vehicle.

As shown in FIG. 12, in the present exemplary embodiment, differently from the third exemplary embodiment, beads 70 respectively serving as cross-section enlarging means are formed at regions of the dash cross member 28 which are below the left and right closed cross-section portions 48. The beads 70 are formed by recessing, toward the dash panel 16 side (the vehicle bottom side), the dash cross member 28 by press working or the like, and are formed so as to extend over the front wall portion 28A, the rear wall portion 28C, and the inclined wall portion 28B of the dash cross member 28. Therefore, the cross-sectional areas of the front end portions of the left and right closed cross-section portions 48 are enlarged as compared with the third exemplary embodiment.

Accordingly, operation and effects which are similar to those of the third exemplary embodiment are obtained by the present exemplary embodiment as well. Further, owing to the beads 70, the cross-sectional areas of the front end portions of the left and right closed cross-section portions 48 are enlarged as compared with the third exemplary embodiment. Thus, the rigidity and strength with which the left and right closed cross-section portions 48 support the dash panel 16 improve, and deformation of the dash panel 16 can be suppressed even more.

The present invention is described in detail above with respect to specific embodiments, but the present invention is not limited to the above-described respective exemplary embodiments, and it will be clear to those skilled in the art that various other embodiments are possible within the scope of the present invention. For example, in the above respective exemplary embodiments, the configurations of the concave portions 20 of the front side members 14 and the concave portion 24 of the dash panel 16, as seen from the vehicle transverse direction, are trapezoidal. However, the configurations of the concave portions 20 and the concave portion 24 as seen from the vehicle transverse direction are not limited to trapezoidal, and may be another shape such as rectangular, semicircular, or the like.

Further, in the above exemplary embodiments, the cross-sectional configuration, as seen from the vehicle longitudinal direction, of the tunnel reinforcement 44 which serves as the reinforcing member is a convex and concave configuration. However, the cross-sectional configuration of the tunnel reinforcement 44 as seen from the vehicle longitudinal direction is not limited to a convex and concave configuration, and may be another cross-sectional configuration such as a wave shape, a substantial U-shape whose side toward the vehicle bottom is open, or the like. Further, a pipe member or the like may be provided as the reinforcing member.

What is claimed is:

1. A vehicle front structure comprising:
left and right front side members each having a front frame portion disposed such that a longitudinal direction of the front frame portion runs along a vehicle longitudinal direction, a rear frame portion which is offset toward a vehicle bottom side with respect to the front frame portion at a vehicle rear side of the front frame portion and which is disposed such that a longitudinal direction of the rear frame portion runs along the vehicle longitudinal direction, and a connecting frame portion having a planar upper surface and connecting a rear end of the front frame portion and a front end of the rear frame portion, and a concave portion, which is recessed below the planar upper surface toward a vehicle cabin outer side being formed at a vehicle top-bottom direction intermediate portion of the connecting frame portion;
a vehicle transverse direction frame member disposed such that a longitudinal direction of the vehicle transverse direction frame member runs along a vehicle transverse direction for a majority of the vehicle's transverse width, and provided within the concave portions of the connecting frame portions at the left and right front side members; and
a dash panel is positioned between the connecting frame portion and the vehicle transverse direction frame member at the concave portion of the front side member.

2. The vehicle front structure of claim 1, further comprising left and right rockers which are disposed at lower portions of vehicle transverse direction outer sides of a vehicle cabin such that longitudinal directions of the rockers run along the vehicle longitudinal direction, and both vehicle transverse direction end portions of the vehicle transverse direction frame member, which extends substantially horizontally toward vehicle transverse direction outer sides, are joined to the left and right rockers.

3. The vehicle front structure of claim 1, wherein the vehicle transverse direction frame member extends continuously over a substantial entirety of a vehicle transverse direction.

4. The vehicle front structure of claim 1, further comprising a reinforcing member which is provided at a top portion of a floor tunnel portion such that a longitudinal direction of the reinforcing member runs along the vehicle longitudinal direction, wherein a front portion of the reinforcing member is joined to a vehicle transverse direction intermediate portion of the vehicle transverse direction frame member, and the reinforcing member supports, from a vehicle rear side, the vehicle transverse direction intermediate portion of the vehicle transverse direction frame member.

5. The vehicle front structure of claim 4, wherein a front end portion of the reinforcing member extends toward a front of the vehicle and is joined to the dash panel.

6. The vehicle front structure of claim 4, wherein the reinforcing member is joined to a rear side surface of a substantially central portion in a vehicle transverse direction of the vehicle transverse direction frame member.

7. The vehicle front structure of claim 4, wherein the reinforcing member is joined to the vehicle transverse direction frame member at a substantially central portion thereof in a vehicle transverse direction, so as to cover an entire upper surface of the central portion of the vehicle transverse direction frame member.

8. The vehicle front structure of claim 4, wherein a bead, which is recessed toward the vehicle bottom side, is formed at a region of the vehicle transverse direction frame member which region is covered by the reinforcing member.

9. The vehicle front structure of claim 4, wherein the vehicle transverse direction frame member has two segments which are divided at a substantially central portion in a vehicle transverse direction, and the reinforcing member is interposed between the two segments.

10. A vehicle front structure comprising:
left and right front side members each having a front frame portion disposed such that a longitudinal direction of the front frame portion runs along a vehicle longitudinal direction, a rear frame portion which is offset toward a vehicle bottom side with respect to the front frame portion at a vehicle rear side of the front frame portion and which is disposed such that a longitudinal direction of the rear frame portion runs along the vehicle longitudinal direction, and a connecting frame portion having a planar upper surface and connecting a rear end of the front frame portion and a front end of the rear frame portion, and a concave portion, which is recessed below the planar upper surface toward a vehicle cabin outer side being formed at a vehicle top-bottom direction intermediate portion of the connecting frame portion;
left and right vehicle transverse direction frame members, each disposed such that a longitudinal direction of the left and the right vehicle transverse direction frame members runs along a vehicle transverse direction for a combined majority of the vehicle's transverse width, and one of the left and the right vehicle transverse direction frame members are provided within the concave portion of each of the connecting frame portions at the left and right front side members,
a dash panel with a dash panel concave portion, and a tunnel reinforcement member disposed between the left and the right vehicle transverse members,
wherein the dash panel concave portion is aligned with the front side member concave portion and accepts the left and the right vehicle transverse frame members and the tunnel reinforcement member.

11. The vehicle front structure of claim 10, wherein the dash panel concave portion comprises at least three surfaces and the tunnel reinforcement member comprises at least three complementary surfaces that contact the at least three surfaces of the dash panel concave portion.

12. The vehicle front structure of claim 10, wherein the tunnel reinforcement member comprises at least three approximately horizontal portions and at least four approximately vertical portions such that a cross-section of the tunnel reinforcement member is approximately M-shaped.

* * * * *